United States Patent [19]

Bronzino et al.

[11] Patent Number: 5,630,594
[45] Date of Patent: May 20, 1997

[54] CHUCK

[75] Inventors: Walter Bronzino; Pier M. Bronzino, both of Turin, Italy

[73] Assignee: SMW Autoblok Spannsysteme GmbH, Meckenbeuren, Germany

[21] Appl. No.: 592,064

[22] Filed: Jan. 26, 1996

[30] Foreign Application Priority Data

Jan. 26, 1995 [DE] Germany .............. 195 02 363.3

[51] Int. Cl.[6] .................................................. B23B 31/167
[52] U.S. Cl. ............................ 279/123; 279/121; 279/125
[58] Field of Search .................................. 279/123, 125, 279/121

[56] References Cited

U.S. PATENT DOCUMENTS

| 3,606,364 | 9/1971 | Benjamin et al. | 279/121 |
| 3,656,773 | 4/1972 | Blattry et al. | 279/121 |
| 3,704,022 | 11/1972 | Blattry et al. | 279/121 |
| 4,969,654 | 11/1990 | Theodolin | 279/123 |

FOREIGN PATENT DOCUMENTS 2736753  2/1979  Germany .

*Primary Examiner*—Steven C. Bishop
*Attorney, Agent, or Firm*—Robert W. Becker & Associates

[57] ABSTRACT

A chuck, each of the clamping jaws of which is adapted to be driven by a wedge bar that can be displaced in the chuck body beyond the clamping stroke to such an extent that the clamping jaws can be removed radially. A locking mechanism in the form of a rotatably held adjusting pin is provided for each clamping jaw. Each wedge bar, on that side that faces the adjusting pin, is provided with a slot-like recess for receiving the adjusting pin in an operating range of the chuck. The slot-like recess extends in the longitudinal direction of the wedge bar. In the operating position of the chuck, the adjusting pin is adapted to be inserted into the slot-like recess in an automatic manner.

9 Claims, 4 Drawing Sheets

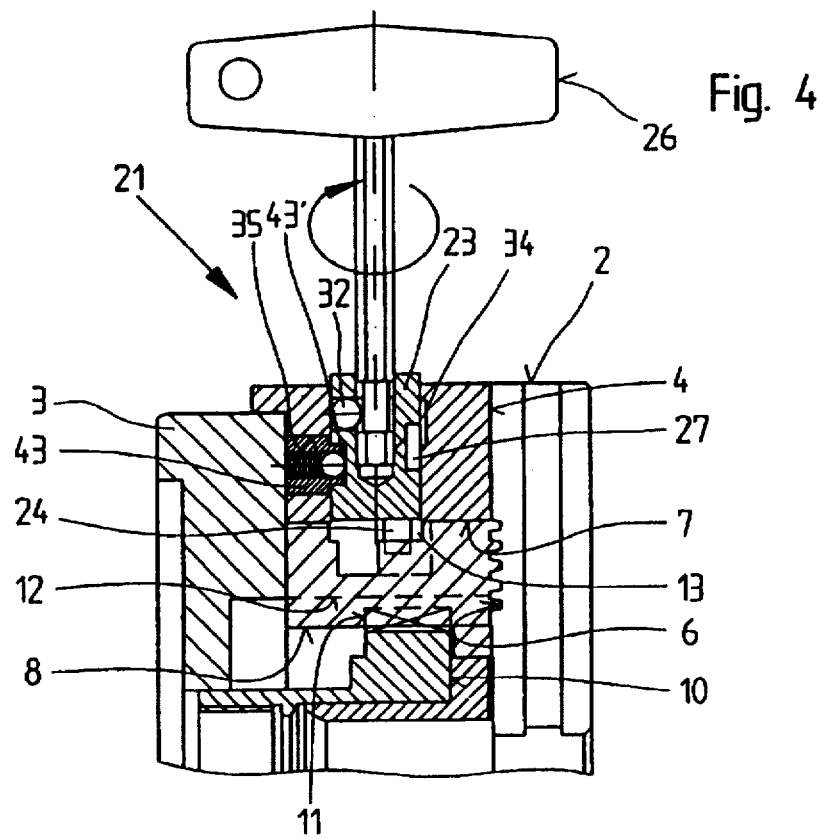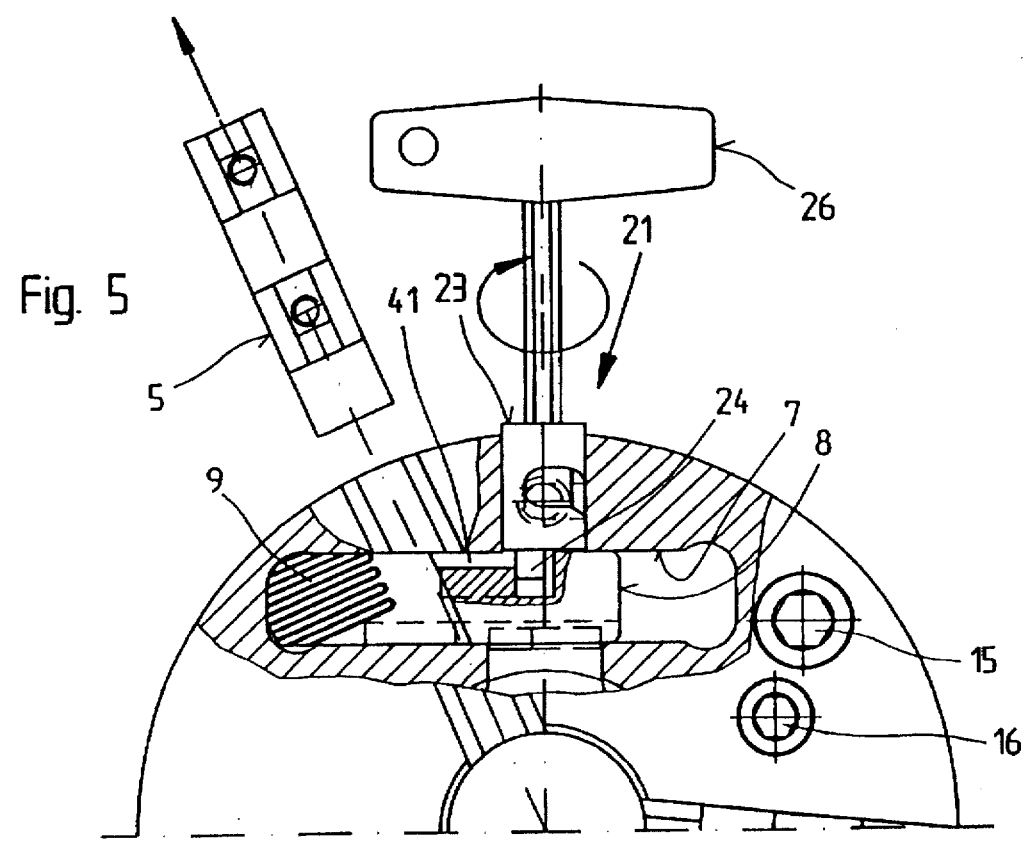

CHUCK

BACKGROUND OF THE INVENTION

The present invention relates to a chuck for turning machines, and includes radially displaceably guided clamping jaws, each of which is adapted to be driven by a wedge bar that is disposed in the chuck body transverse to the longitudinal axis and is provided with teeth for engaging teeth of the clamping jaw. In addition, the wedge bars are displaceable in the chuck body beyond the clamping stroke to such an extent that the teeth thereof disengage from the pertaining clamping jaw and the latter can be removed radially from the chuck body. Each clamping jaw is provided with a locking mechanism that is respectively formed of an adjusting pin that is rotatably held in the chuck body and that by means of a cam, an eccentric, or the like engages in an angular recess formed in the wedge bar.

A chuck of this general type is known from DE-C 27 36 753. Although this known chuck has proved to be satisfactory in practice, if it is improperly handled the danger of an accident occurring cannot be precluded. In particular, in the case of internal clamping when the chuck rotates the clamping force is increased due to the centrifugal forces generated by the clamping jaws. If for an internal clamping a static clamping force that is too high is selected, and the increase clamping force due to rotation is not taken into account, it is possible under certain circumstances for cast pieces, such as thin-walled workpieces, to suddenly break. Due to the fact that the clamping force is reduced in an abrupt manner, the wedge bars are sometimes accelerated in such a way that the cams that are formed on the adjusting pins in an offset manner can be sheared off by the wedge bars. In such a case, the clamping jaws are no longer fixed in place so that there is a real danger of an accident when such a failure occurs.

It is therefore an object of the present invention to improve the locking mechanisms provided for a chuck of the aforementioned general type in such a way that even when breakage of a clamped-in workpiece occurs due to improper operation the locking mechanism prevents the teeth of the wedge bars and of the clamping jaws from disengaging so that these components cannot be hurled out. Rather, the wedge bars should always be fixed in place by the locking mechanism in such a way that they cannot be unintentionally shifted beyond their clamping stroke, so that they are reliably held by the locking mechanisms and accidents are thus precluded.

BRIEF DESCRIPTION OF THE DRAWINGS

This object, and other objects and advantages of the present invention, will appear more clearly from the following specification in conjunction with the accompanying schematic drawings, in which:

FIG. 4 shows the chuck of FIG. 1 during release of the jaws;

FIG. 5 is a partially cross-sectioned front view of the chuck of FIG. 4;

SUMMARY OF THE INVENTION

Figure 1:
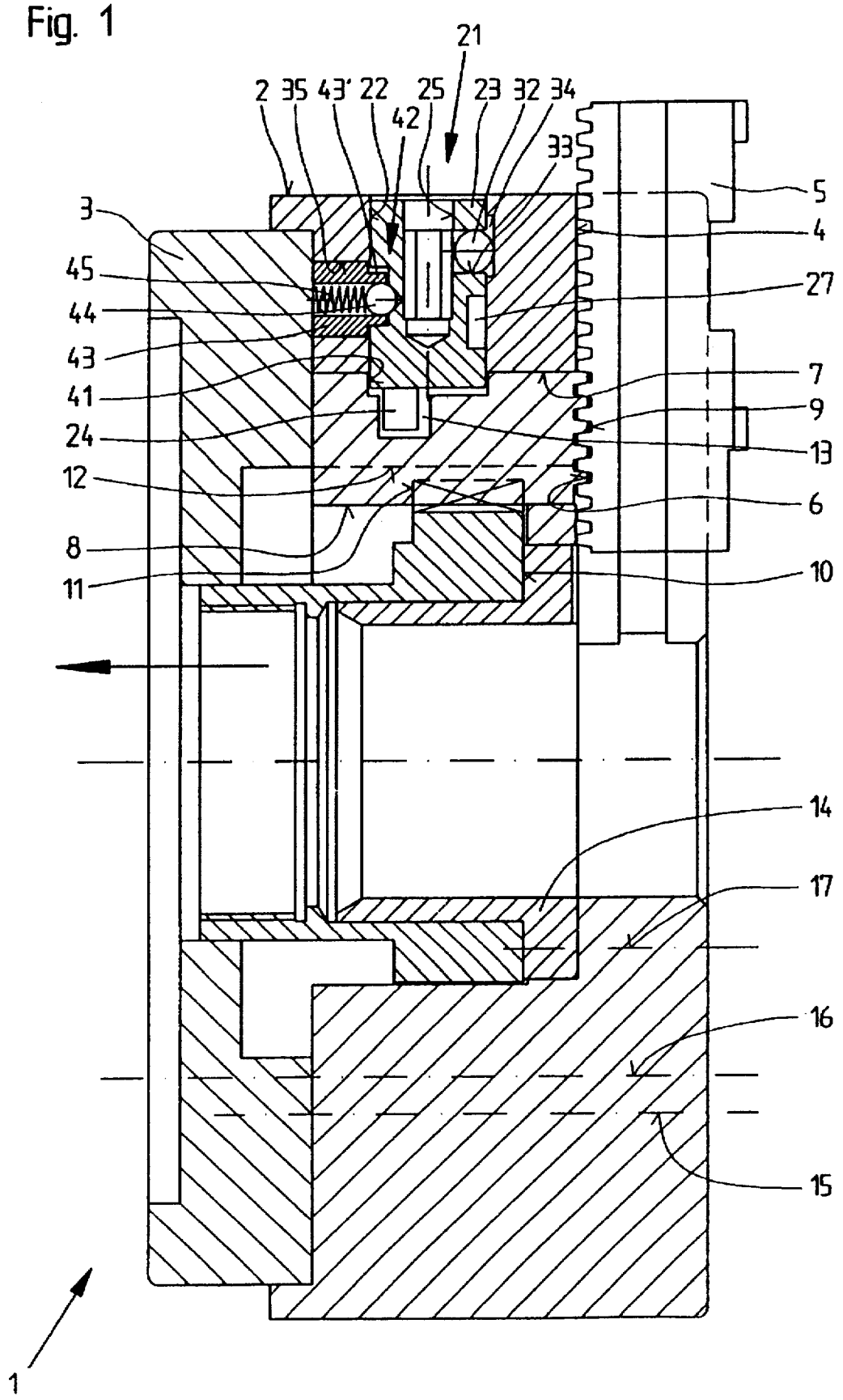
FIG. 1 is an axial cross-sectional view, in the operating position, of one exemplary embodiment of the inventive chuck provided with a locking mechanism.

The chuck of the present invention is characterized primarily in that each of the wedge bars, on that side that faces the adjusting pin, is provided with a slot-like recess for receiving the adjusting pin in the operating range of the chuck, with the slot-like recess extending in the longitudinal direction of the wedge bar beyond the clamping stroke associated therewith, and in that in an operating position of the chuck the adjusting pin is adapted to be inserted into the slot-like recess of the wedge bar in an automatic or guided manner.

For the automatic insertion of the adjusting pin into the slot-like recess of the wedge bar it is suitable to provide a control element that is disposed in the chuck body perpendicular to the axis of the adjusting pin, and to also provide a cam that is formed in the outer surface of the adjusting pin and that is constantly engaged by the control element.

In this connection, the cam should comprise two cam sections that extend perpendicular to the axis of the adjustment pin and are offset in height relative to one another, and a cam section that extends at an angle and interconnects the other two cam sections. Furthermore, the control element should comprise a bushing or a bolt that is disposed in a bore of the chuck body and that is formed in a stepped manner on the end face that faces the adjusting pin and respectively along with the stepped part engages into the cam of the adjusting pin, whereby the control element should be provided with a spring detent that can be introduced into a recess that is formed in the cam and is associated with the operating position of the chuck.

It is also advantageous if the ends of the slot-like recesses that are formed in the wedge bars for receiving the adjusting pins are respectively embodied as abutment surfaces that are adapted to the cross-sectional configuration of the adjusting pins, with the depth of the slot-like recesses and the axial length of the adjusting pins being coordinated with one another in such a way that in the operating position of the chuck the adjusting pins extend approximately flush with the outer surface of the chuck.

In addition, the adjusting pin should be provided with a centrally disposed keyhole into which, during release of the jaws, can be introduced a blocking member, which is, for example, embodied as a ball and is radially displaceable via a groove provided in the chuck body, so that a key that is placed in the adjusting pin can be removed only when the clamping jaws are held in the teeth of the wedge bars.

When the inventive locking mechanisms are associated with the clamping jaws of a chuck of the initially mentioned type, this ensures that the wedge bars cannot unintentionally be shifted beyond their clamping stroke so that their teeth cannot disengage from the teeth of the clamping jaws. In particular, due to the slot-like recesses provided in the wedge bars, it is possible for the entire cross-sectional area of the adjusting pins to engage the wedge bars in the operating position of the chuck, thus precluding a shearing-off of the adjusting pins, even when a clamped-in workpiece breaks. This reliably guarantees that in the operating range of the wedge bars the clamping jaws are always positively coupled with the wedge bars and cannot be hurled away.

DESCRIPTION OF PREFERRED EMBODIMENTS

Referring now to the drawings in detail, shown is a chuck 1 for turning machines. The chuck 1 has an annular chuck body 2, the back side of which is closed off by a cover or back plate 3 that is secured by means of screws or similar fastening means 15. Disposed in the chuck body 2 on the front side thereof in radially directed grooves or slots 4 are clamping jaws 5 between which a non-illustrated workpiece is clamped when it is being machined or otherwise worked on. To radially displace the clamping jaws 5 inwardly or outwardly, respective wedge bars 8 are provided that are disposed in pockets 7 formed in the chuck body 2 tangential to a base circle; the teeth 9 of the wedge bars 8 engage teeth 6 of the associated clamping jaws 5. In addition, the inwardly facing sides of the wedge bars 8 are provided with inclined wedge surfaces 12 that cooperate with wedge hook or shoulder wedges 11 that are disposed on an axially displaceable piston 10. The piston 10 is additionally guided in the chuck body 2 by means of a bushing 14 that is held on the chuck body 2 via screws 17.

A tie rod, to which a servo arrangement is connected, is to be coupled in the piston 10. If the piston is now displaced to the right or to the left, the wedge bars 8 are displaced in the pockets 7 via the shoulder wedges 11. And since the wedge bars 8 are positively connected with the clamping jaws 5 by means of the teeth 6 that engage the teeth 9 of the wedge bars 8, the axial movement of the piston 10 is thus converted into a radial displacement of the clamping jaws 5.

Each clamping jaw 5 is provided with a locking mechanism 21 in order preclude a workpiece that is clamped between the clamping jaws 5, and hence is in the operating position, from being hurled out of the chuck body 2, for example if the workpiece suddenly breaks. With the aid of the locking mechanism 21 it is furthermore possible for the wedge bars 8 to be additionally displaced so far into the pockets 7 and beyond the clamping range of the chuck 1 that the teeth 9 of the wedge bars 8 are no longer in engagement with the teeth 6 of the clamping jaws 5, so that the clamping jaws can be shifted in the slots 4 or even removed therefrom and if desired can be replaced or exchanged.

Each of the locking mechanisms 21 comprises an adjusting pin 23 that is disposed in a radially extending bore 22 in the chuck body 2; formed on the inner end face of the adjusting pin 23 is an offset eccentric cam 24. The cam 24 engages in an angular recess 13 that is provided in the associated wedge bar 8. In addition, the adjusting pin 23 is provided with a central keyhole 25 in which a key 26 is inserted for releasing the clamping jaws 5, as illustrated in FIGS. 4 and 5. In this operating position, by turning the adjusting pin 23 the wedge bars 8 are shifted in such a way that the teeth 9 thereof are released from the teeth 6 of the clamping jaws 5.

In order in the operating position to secure the wedge bars 8 not only by the cam 24 that is formed on the adjusting pin 23 but also by the adjusting pin 23 itself, that side of each of the wedge bars 8 that faces the adjusting pin is provided with a slot-like recess 41 that extends over a length coordinated with the operating range of the chuck 1. In addition, in the operating position of the chuck 1 the adjusting pin 23 can be inserted into the recess 41 in an automatic or guided manner with the aid of a control or correction element 42.

Figure 6:
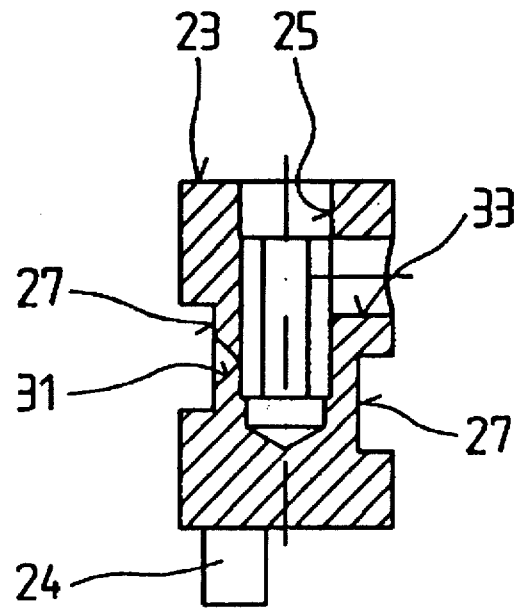
FIG. 6 is an axial cross-sectional view of the adjusting pin provided for the chuck of FIG. 1.
Figure 7:
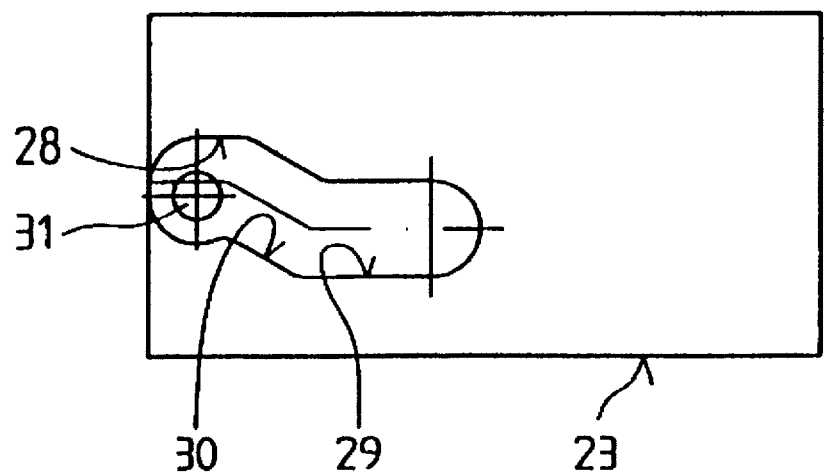
FIG. 7 shows a modification of the outer surface of the adjusting pin of FIG. 6.

In order to make this possible, as can be seen in detail from FIGS. 6 and 7, a cam 27 into which the control element 42 engages is formed in the adjusting pin 23. The cam means 27 comprises two cam sections 28 and 29 that extend perpendicular to the axis of the adjusting pin 23, are disposed at different heights, and are interconnected by a cam section 30 that extends at an angle. The control element 42 is formed by a stepped bushing 43 that is disposed in a bore 35 that is formed in the chuck body 2. The stepped portion 43' of the bushing 43 extends beyond the surface of the bore 22 that accommodates the adjusting pin 23 and thus extends into the cam 27.

Figure 2:
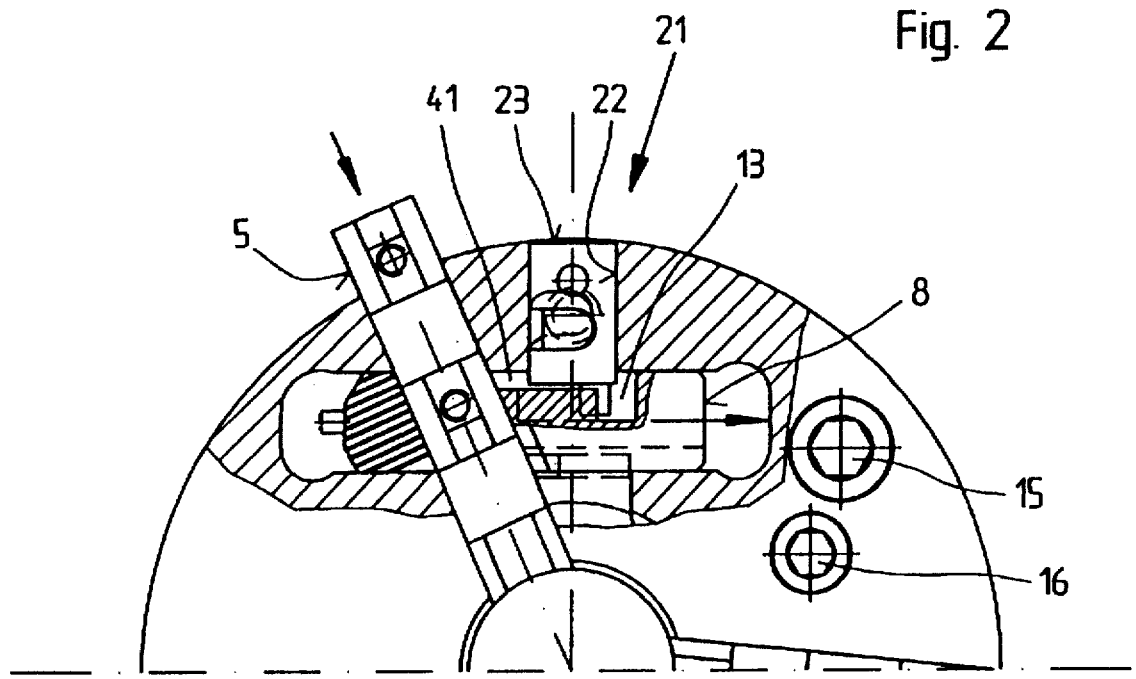
FIG. 2 is a partially cross-sectioned front view of the chuck of FIG. 1.
Figure 3:
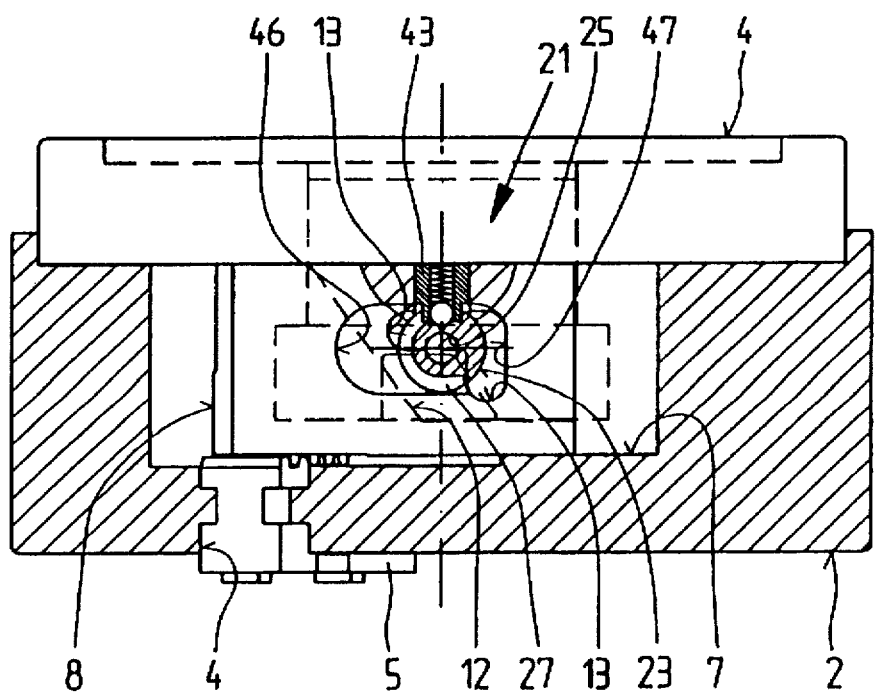
FIG. 3 is a partially cross-sectioned top view of the chuck of FIG. 1.

When the adjusting pin 23 is rotated with the aid of the key 26, the engagement of the control element 42 in the cam 27 of the adjusting pin 23 causes the adjusting pin to either be inserted into the recess 41 of the wedge bar 8, as shown in FIGS. 1 and 2, or to be withdrawn therefrom as shown in FIGS. 4 and 5, so that the wedge bars 8 can either be secured by the adjusting pins 23 or can be displaced beyond the clamping stroke with the aid of the cam 24 to allow release of the clamping jaws 5.

Also disposed in the bushing 43 is the spring detent that is comprised of a ball 44 and a spring 45; the spring detent cooperates with a notch 31 formed in the adjusting pin 23 in the vicinity of the cam section 28. In this way the adjusting pin 23 is fixed in the operating position of the chuck 1. In addition, the engagement surfaces at the end faces of the recess 41 are respectively in the form of abutment surfaces 46 and 47 that are adapted to the cross-sectional shape of the adjusting pin 23. As a consequence, an undesired uncoupling of the positive connection between the teeth 6 of the clamping jaws 5 and the teeth 9 of the wedge bars 8 is precluded.

The depth of the recesses 41 that are formed in the wedge bars 8, and the axial length of the adjusting pins 23, are coordinated with one another in such way that in the operating position of the chuck 1 the adjusting pins 23 are flush with the outer surface of the chuck body 2, which is to be secured to a turning machine by means of screws or similar fastening means 16 that extend through the chuck body. In contrast, when the clamping jaws 5 are released, the adjusting pins 23 extend beyond the outer surface of the chuck body 2, as illustrated in FIGS. 4 and 5; as a result, it is possible to provide a visual control to show the respective operating position of the chuck 1.

In order during the release of the clamping jaws 5 to preclude that the key 26 can be pulled out of the keyhole 25 of the adjusting pin 23, a ball-shaped blocking member 32 is disposed in a transverse bore 33 of the adjusting pin 23, and an associated, partially circumferential groove 34 is formed in the chuck body 2. In the operating position of the chuck 1, the blocking member 32 engages partially into the groove 34 so that when the chuck 1 is stopped, the key 26 can be introduced into the keyhole 25. However, if the key 26 is turned, the blocking member 32 is shifted by the chuck body 2 in the direction of the key 26 and thus engages partially in a corresponding recess of the key 26 so that the latter is fixed in position and cannot be removed from the adjusting pin 23. Only when the wedge bars 8 are again in the operating position is the blocking of the key 26 released.

The present invention is, of course, in no way restricted to the specific disclosure of the specification and drawings, but also encompasses any modifications within the scope of the appended claims.

What we claim is:

1. A chuck for turning machines, comprising:
   a chuck body;
   clamping jaws that are radially displaceably guided in said chuck body and are provided with teeth;
   wedge bars that are disposed in said chuck body transverse to a longitudinal axis thereof, said wedge bars being provided with teeth for engaging said teeth of said clamping jaws for driving the latter, said wedge bars being displaceable in said chuck body beyond a clamping stroke to such an extent that said teeth of said wedge bars do not engage said teeth of said clamping jaws so that said clamping jaws can be radially removed from said chuck body; and a locking mechanism for each of said clamping jaws, including an adjustment pin that is rotatably held in said chuck body and that is provided with an eccentric means for engaging an angular recess formed in said wedge bars, wherein each of said wedge bars, on a side facing one of said adjusting pins, is provided with a slot-like recess for receiving said adjusting pin in an operating range of said chuck, said slot-like recess extending in a longitudinal direction of said wedge bar beyond said clamping stroke, and wherein in an operating position of said chuck said adjusting pin is adapted to be inserted into said slot-like recess of said wedge bar in an automatic manner.

2. A chuck according to claim 1, which, for said automatic insertion of said adjusting pin into said slot-like recess of said wedge bar, includes a control element that is disposed in said chuck body perpendicular to a longitudinal axis of said adjusting pin, and wherein an outer surface of said adjusting pin is provided with cam means that is constantly engaged by said control element.

3. A chuck according to claim 2, wherein said cam means is formed in said outer surface of said adjusting pin and comprises two first cam sections that are disposed at different levels relative to one another and extend at right angles to said longitudinal axis of said adjusting pin, said cam means further comprising an angled second cam section that interconnects said two first cam sections.

4. A chuck according to claim 2, wherein said control element comprises a bushing or bolt that is disposed in a bore of said chuck body and that on an end face that faces said adjusting pin has a stepped configuration formed by a stepped part that engages in said cam means of said adjusting pin.

5. A chuck according to claim 4, wherein said control element is provided with a spring detent that is adapted to be inserted into a notch that is formed in said cam means and is associated with said operating position of said chuck.

6. A chuck according to claim 2, wherein ends of said slot-like recess of said wedge bar for receiving said adjusting pin are respectively embodied as abutment surfaces that are adapted to cross-sectional surface configurations of said adjusting pin.

7. A chuck according to claim 2, wherein a depth of said slot-like recess of said wedge bar, and an axial length of said adjusting pin, are coordinated with one another in such a way that in said operating position of said chuck said adjusting pin is approximately flush with an outer surface of said chuck body.

8. A chuck according to claim 2, wherein said adjusting pin is provided with a centrally disposed keyhole into which, during release of said clamping jaws, can be inserted a blocking member that is radially displaceably disposed in a groove provided in said chuck body.

9. A chuck according to claim 8, wherein said blocking member is in the form of a ball.

* * * * *

UNITED STATES PATENT AND TRADEMARK OFFICE
CERTIFICATE OF CORRECTION

```
PATENT NO.   : 5,630,594
DATED        : May 20, 1997
INVENTOR(S)  : Bronzino et al
```

It is certified that error appears in the above-indentified patent and that said Letters Patent is hereby corrected as shown below:

```
   On the title page, item

[75]   Inventors:  Walter Bronzino; Pier M. Bronzino,
                   both of Torino, Italy
```

Signed and Sealed this

Fifth Day of August, 1997

*Attest:*

BRUCE LEHMAN

*Attesting Officer*     *Commissioner of Patents and Trademarks*